(12) United States Patent
Cunningham et al.

(10) Patent No.: US 8,202,412 B2
(45) Date of Patent: Jun. 19, 2012

(54) REDUCED ELEVATION CATALYST RETURN LINE FOR A FLUID CATALYTIC CRACKING UNIT

(75) Inventors: Brian A. Cunningham, Ellicott City, MD (US); Christopher G. Smalley, Manassas, VA (US); Rathna P. Davuluri, Fairfax, VA (US); Dana W. Nouri, McLean, VA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 401 days.

(21) Appl. No.: 11/879,259

(22) Filed: Jul. 17, 2007

(65) Prior Publication Data

US 2009/0020454 A1    Jan. 22, 2009

(51) Int. Cl.
*C10G 11/00* (2006.01)
*B01J 8/18* (2006.01)

(52) U.S. Cl. ......... 208/113; 208/106; 422/139; 422/144

(58) Field of Classification Search ................... 208/113
See application file for complete search history.

(56) References Cited

U.S. PATENT DOCUMENTS

| | | | |
|---|---|---|---|
| 2,881,133 A * | 4/1959 | Whiteley et al. | 422/141 |
| 3,781,197 A * | 12/1973 | Bryson et al. | 208/113 |
| 3,923,642 A | 12/1975 | Luckenbach et al. | |
| 4,090,948 A * | 5/1978 | Schwarzenbek | 208/113 |
| 4,138,219 A | 2/1979 | Colvert et al. | |
| 4,260,475 A * | 4/1981 | Scott | 208/113 |
| 4,405,445 A * | 9/1983 | Kovach et al. | 208/113 |
| 4,523,987 A * | 6/1985 | Penick | 208/113 |
| 5,053,203 A * | 10/1991 | Mauleon et al. | 422/144 |
| 5,171,423 A | 12/1992 | Kruse | |
| 5,175,943 A | 1/1993 | Eastham et al. | |
| 5,188,805 A | 2/1993 | Sabottke | |
| 5,552,119 A | 9/1996 | Holmes | |
| 5,554,341 A * | 9/1996 | Wells et al. | 208/113 |
| 5,853,568 A | 12/1998 | Brander | |
| 6,610,255 B1 | 8/2003 | Cao et al. | |
| 2001/0035369 A1 * | 11/2001 | Mon et al. | 208/113 |
| 2001/0040118 A1 | 11/2001 | Mon et al. | |
| 2002/0014438 A1 | 2/2002 | Swan, III | |
| 2005/0269246 A1 * | 12/2005 | Wachter et al. | 208/113 |
| 2006/0144758 A1 * | 7/2006 | Swan et al. | 208/113 |
| 2008/0093263 A1 * | 4/2008 | Cheng et al. | 208/113 |

FOREIGN PATENT DOCUMENTS

| | | |
|---|---|---|
| DE | 41 03 450 A1 | 2/1991 |
| EP | 0 070 682 | 7/1982 |
| EP | 63901 A1 * | 11/1982 |
| EP | 0 594 622 B1 | 12/1995 |

* cited by examiner

*Primary Examiner* — Prem C Singh
*Assistant Examiner* — Michelle Stein
(74) *Attorney, Agent, or Firm* — Bruce M. Bordelon

(57) ABSTRACT

The present invention is an improved regenerated catalyst bend assembly for a fluid catalytic cracking unit. In a preferred embodiment, the reduced elevation ("RE-bend" or "REL-bend") regenerated catalyst return line assembly of the present invention has an outlet elevation that is lower than the inlet elevation of the RE-bend or REL-bend regenerated catalyst return line assembly, and a process for utilizing the assembly in a fluid catalytic cracking unit. The present invention is especially useful in the modification of existing fluid catalytic cracking units to lower the elevation of the outlet of the regenerated catalyst return line assembly, thereby providing needed space to increase the fluid catalytic cracking reactor riser length.

17 Claims, 5 Drawing Sheets

REDUCED ELEVATION CATALYST RETURN LINE FOR A FLUID CATALYTIC CRACKING UNIT

FIELD OF THE INVENTION

This invention relates to the fluid catalytic cracking of a hydrocarbon feed. In particular, this invention relates to an improved design for a catalyst return line for returning regenerated catalyst from the regenerator of a fluid catalytic cracking unit to the riser of a fluid catalytic cracking unit and a process for using the catalyst return line in a fluid catalytic cracking unit.

BACKGROUND OF THE INVENTION

Conversion of high molecular weight petroleum feeds to more valuable products by catalytic processes such as fluidized catalytic cracking is important to petroleum processes. In the fluidized catalytic cracking process, higher molecular weight feeds are contacted with fluidized catalyst particles in the riser reactor of the fluidized catalytic cracking unit. The contacting between feed and catalyst is controlled according to the type of product desired. In catalytic cracking of the feed, reactor conditions such as temperature and contact time are controlled to maximize the products desired and minimize the formation of less desirable products such as light gases and coke.

Miscellaneous fluidized catalytic cracking reactor riser and reactor vessel designs have been utilized in the past. However, with the advance of zeolitic cracking catalysts with greatly improved cracking activity, most modern fluidized catalytic cracking reactors utilize a short-contact time cracking configuration in which the amount of time that the catalyst and the fluidized catalytic cracker feedstream are in contact is limited in order to minimize the amount of excessive cracking which results in the increased production of less valued products such as light hydrocarbon gases as well as increased coking deposition on the cracking catalysts. Most short-contact time fluidized catalytic cracking configurations utilize a reactor riser cracking configuration wherein the catalyst is contacted with the fluidized catalytic cracker feedstock in a reactor riser, and the catalyst and the hydrocarbon reaction products are separated shortly after the catalyst and hydrocarbon mixture leaves the reactor riser and enters the fluidized catalytic cracking reactor. Although there are many different fluidized catalytic cracking reactor designs in use, most use mechanical cyclones internal to the reactor to separate the catalyst from the hydrocarbon reactor products as quickly and efficiently as possible. This rapid separation process has the benefits of both minimizing post-riser reactions between the catalyst and the hydrocarbons as well as providing a physical means for separating the products to be sent for further processing from the spent catalyst which is sent to a regenerator stage prior to reintroducing as regenerated catalyst back into the reaction process.

These significant improvements in catalyst technology have led to most conventional fluidized catalytic cracking reactors being designed for short contact time processes. That is, it is desired that cracking reactions be significantly limited to the reaction in the reactor riser followed by a very fast separation of hydrocarbons from the catalysts in order to prevent unwanted reactions or "over cracking" of the hydrocarbon feedstocks and/or reaction products. Therefore, most modern fluidized catalytic cracking units incorporate a quick hydrocarbon/catalyst separation mechanism after the hydrocarbon/catalyst stream leaves the reactor riser. Mechanical cyclones, as discussed above, are generally the most common method utilized for making the bulk of the catalyst/oil separation in the fluidized catalytic cracking processes.

However, even with these improved catalysts, in some instances it may desirable to design a fluidized catalytic cracking reactor riser with an increased overall length or extend the length of an existing reactor riser. Especially in the case of an existing reactor fluidized catalytic cracking unit, it may be beneficial extend the length of an existing reactor riser to either 1) increase the amount of reaction time in the reactor riser, and/or 2) increase the velocity in the reactor riser while still maintaining a similar overall riser reaction time. Other reasons for desiring to extend the reactor riser may be to incorporate larger feed zones into the reactor riser featuring improved injection and contact zone designs, or adding additional hardware or auxiliary equipment associated with the lift gas injection or the feed zone.

However, especially in the case of an existing reactor riser, it may be difficult to extend the length of an existing reactor riser due to the existing return bend assembly configurations. Typically, these existing catalyst return line assembly configurations are either a "U-bend" configuration or a "J-bend" configuration. A U-bend is typically a 180° inclusive angle bend of constant radius connecting the regenerated catalyst return line with the reactor riser. Since the bend is essentially 180° in curvature with a constant bend radius, the top of each end of the U-bend in substantially at the same elevation in a fluidized catalytic cracking unit. In contrast, the elevation of the outlet of the J-bend assembly is higher than the inlet of the J-bend assembly by using a combination of two bends of differing inclusive bend radii separated by a section of straight pipe connecting the two bends.

U-bend and J-bend fluidized catalytic cracking unit catalyst return line configurations are illustrated in U.S. Pat. Nos. 3,923,642 to Luckenbach et al.; 5,171,423 to Kruse; 5,175,943 to Eastham et al.; 5,552,119 to Holmes; 5,554,341 to Wells et al.; 5,846,403 to Swan et al.; and 6,610,255 to Cao et al. These U-bend and J-bend fluidized catalytic cracking unit catalyst return line configurations have been used extensively for many years in the industry.

In some existing fluidized catalytic cracking units, it may be easier to increase the length of the reactor riser if the regenerated catalyst return line assembly is of the J-bend configuration rather than the U-bend configuration, since it may be easier to increase the length of the reactor riser by changing the bend angles and straight line offset length or angle. However, increasing the acuteness of the bend angles in the J-bend assembly to increase the reactor riser length can impart an increase pressure drop in the return bend/reactor riser circuit thereby resulting in detrimental effects on the fluidized catalytic cracking system capacity and performance.

Retrofitting a U-bend regenerated catalyst return line configuration to increase the reactor riser length can be even more problematic. In order to increase the reactor riser length without extending the regenerator standpipe, the bend radius of the U-bend assembly must be decreased. Decreasing the radius of the U-bend assembly results in two problems. First, the decreased radius U-bend now has an overall shorter span and thus the two ends of the U-bend cannot align with both the regenerator standpipe and the reactor riser. Secondly, even if either the regenerator standpipe or the reactor riser can be relocated to fit up with the shorter radius U-bend, the pressure drop in the new shorter radius U-bend will typically be greater than the original longer radius U-bend.

Additionally, especially in the case of modifying existing FCC units, desired changes in the length of reactor risers may result in interferences with existing equipment and transfer lines.

Therefore, there exists a need in the industry for a regenerated catalyst bend assembly with differing configuration characteristics that can improve the ease of installation especially when retrofitting existing units. It is even more desired that this new regenerated catalyst bend assembly allow reactor risers of increased length to be installed without increasing the overall pressure drop across the overall catalyst return line bend/reactor riser as compared with a bend assembly of the prior art.

SUMMARY OF THE INVENTION

A preferred embodiment of the present invention is an improved regenerated catalyst bend assembly for a fluid catalytic cracking unit. In a preferred embodiment, the reduced elevation ("RE-bend" or "REL-bend") regenerated catalyst return line assembly of the present invention has an outlet elevation that is lower than the inlet elevation of the RE-bend or REL-bend regenerated catalyst return line assembly. Another preferred embodiment of the present invention is a process for catalytically cracking a hydrocarbon feedstream utilizing the regenerated catalyst bend assembly of the present invention. The present invention is especially useful in the modification of existing fluid catalytic cracking units to lower the elevation of the outlet of the regenerated catalyst return line assembly, thereby providing needed space to increase the fluid catalytic cracking reactor riser length.

One preferred embodiment of the present invention is a regenerated catalyst conduit for fluidly connecting a regenerator standpipe to a reactor riser of a fluid catalytic cracking unit, comprising:
- a) a first bend with a bend radius, $R_1$, and an inlet end and an outlet end; and
- b) a second bend with a bend radius, $R_2$, and an inlet end and an outlet end;
  wherein the inlet end of the first bend is physically connected to the outlet end of the regenerator standpipe, the outlet end of the first bend is physically connected to the inlet end of the second bend, the outlet end of the second bend is physically connected to the inlet end of the reactor riser, and $R_1$ is not equal to $R_2$.

In another preferred embodiment of the regenerated catalyst conduit of the present invention, the outlet end of second bend is at a lower elevation than the inlet end of the first bend. In a more preferred embodiment, the first bend radius, $R_1$, is greater than the second bend radius, $R_2$. In an even more preferred embodiment, the internal angle of the first bend, $\alpha_1$, is greater than the internal angle of the second bend, $\alpha_2$.

Another preferred embodiment of the present invention is a regenerated catalyst conduit for fluidly connecting a regenerator standpipe to a reactor riser of a fluid catalytic cracking unit, comprising:
- a) a bend with a bend radius, $R_{REL}$, and a bend inlet end and a bend outlet end; and
- b) a conduit inlet end and a conduit outlet end;
  wherein the inlet end of the conduit is physically connected to the outlet end of the regenerator standpipe, and the outlet end of the conduit is physically connected to the reactor riser, wherein the centerline of the reactor riser and the centerline of the outlet end of the conduit are at substantially a 90° angle.

Another preferred embodiment of the present invention is a fluid catalytic cracking process, comprising:
- a) catalytically cracking a hydrocarbon-containing feedstream in a reactor riser the presence of a fluidized catalyst to form a mixture of a cracked hydrocarbon product stream and a spent catalyst;
- b) separating the cracked hydrocarbon product stream from the spent catalyst, wherein the spent catalyst comprises hydrocarbon residue;
- c) regenerating at least a portion of the spent catalyst in a regenerator by combusting at least a portion of the hydrocarbon residue in an oxygen-containing atmosphere to produce a regenerated catalyst;
- d) conducting at least a portion of the regenerated catalyst from the regenerator to a regenerated catalyst conduit through a regenerator standpipe; and
- e) transporting at least a portion of the regenerated catalyst to the reactor riser through the regenerated catalyst conduit;
  wherein the regenerated catalyst conduit fluidly connects the regenerator standpipe to the reactor riser and is comprised of a first bend with a bend radius, $R_1$, and an inlet end and an outlet end; and a second bend with a bend radius, $R_2$, and an inlet end and an outlet end; wherein the inlet end of the first bend is physically connected to the outlet end of the regenerator standpipe, the outlet end of the first bend is physically connected to the inlet end of the second bend, the outlet end of the second bend is physically connected to the inlet end of the reactor riser, and $R_1$ is not equal to $R_2$.

Yet another preferred embodiment of the present invention includes a fluid catalytic cracking process, comprising:
- a) catalytically cracking a hydrocarbon-containing feedstream in a reactor riser the presence of a fluidized catalyst to form a mixture of a cracked hydrocarbon product stream and a spent catalyst;
- b) separating the cracked hydrocarbon product stream from the spent catalyst, wherein the spent catalyst comprises hydrocarbon residue;
- c) regenerating at least a portion of the spent catalyst in a regenerator by combusting at least a portion of the hydrocarbon residue in an oxygen-containing atmosphere to produce a regenerated catalyst;
- d) conducting at least a portion of the regenerated catalyst from the regenerator to a regenerated catalyst conduit through a regenerator standpipe; and
- e) transporting at least a portion of the regenerated catalyst to the reactor riser through the regenerated catalyst conduit;
  wherein the regenerated catalyst conduit fluidly connects the regenerator standpipe to the reactor riser and is comprised of a bend with a bend radius, $R_{REL}$, and a bend inlet end and a bend outlet end; and a regenerated catalyst conduit inlet end and a conduit outlet end; wherein the inlet end of the regenerated catalyst conduit is physically connected to the outlet end of the regenerator standpipe, and the outlet end of the regenerated catalyst conduit is physically connected to the reactor riser, wherein the centerline of the reactor riser and the centerline of the outlet end of the regenerated catalyst conduit are at substantially a 90° angle.

DESCRIPTION OF THE PREFERRED EMBODIMENTS

The present invention relates to novel configurations for regenerated catalyst return line for fluid catalytic cracking units. It should be noted that the term fluid catalytic cracking units as utilized herein include any catalytic cracking unit wherein a the unit contains a reactor (or reactor riser) wherein a fluidized catalyst is contacted with a hydrocarbon-containing feed stream at temperatures above about 900° F. to produced a cracked hydrocarbon product which is subsequently separated from the fluidized catalyst, and wherein at least a portion of the separated fluidized catalyst is sent to a regenerator wherein at least a portion of the carbon adhered to the spent catalyst is removed by combustion and the cracked hydrocarbon product has a lower average boiling point than the hydrocarbon-containing feed stream. This process may include refinery fluid catalytic cracking units (herein referred to by the term "FCC") which processes a refinery hydrocarbon-containing stream with components boiling in the range from about 430° F. to about 1050° F. (221 to 566° C.) to produce a lower average boiling point product stream as well as fluid catalytic cracking units used to increase chemical feedstock production of unsaturated cracked hydrocarbon products such as, but not limited to, comprising olefins or aromatic hydrocarbons. The term "FCC" as used herein is a term to specifically designate a refinery fluid catalytic cracking units which processes a refinery hydrocarbon-containing stream with components boiling in the range from about 430° F. to about 1050° F. (221 to 566° C.) to produce a lower average boiling point product stream. The present invention may also be applied to fluid catalytic cracking units with multiple reactor risers.

Figure 1:
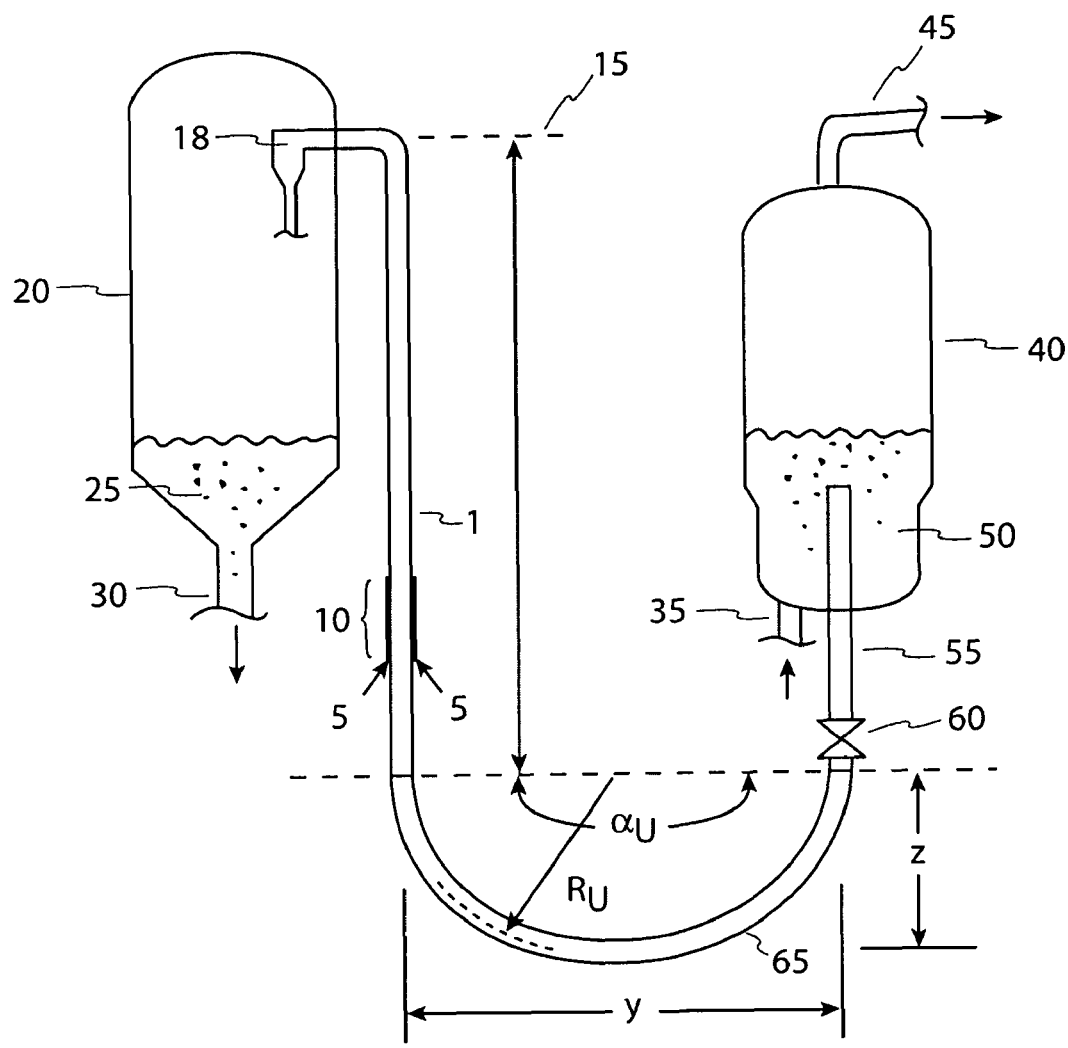
FIG. 1 depicts a simplified illustration of typical U-bend configuration of the prior art for a regenerated catalyst return line in conjunction with the regenerator standpipe and reactor riser of a fluid catalytic cracking unit.

The regenerated catalyst return lines of the prior art include what is commonly termed as either U-bend or J-bend configurations. A typical U-bend configuration of the prior art is illustrated in FIG. 1 herein in conjunction with a typical fluid catalytic cracking unit reactor, reactor riser and regenerator. The illustration in FIG. 1 is highly simplified to focus on the U-bend configuration of the regenerated catalyst return lines of the prior art in relationship with the fluid catalytic cracking unit reactor, reactor riser and regenerator. As can be seen in FIG. 1, in a typical fluid catalytic cracking unit incorporating a U-bend configuration regenerated catalyst return line has a reactor riser (1) wherein a hydrocarbon-containing feed (5) is injected into the reactor riser in an area of the reactor riser generally termed as the feed zone (10). The feed zone (10) is a section of the reactor riser (1) wherein most of the hydrocarbon-containing feed is contacted with the hot regenerated catalyst (50) being returned to the reaction riser after being regenerated in the fluid catalytic cracking unit regenerator (40). The primary function of the feed zone is to optimize the contact distribution of the hydrocarbon-containing feed (or "oil") (5) with the hot regenerated catalyst (50) from the regenerator (40). After contacting in the feed zone, the combined catalyst/oil mixture stream continues flowing up the reactor riser to the fluid catalytic cracking reactor (20).

Although the overall vessel shown as element 20 in FIG. 1 is generally termed the "reactor", under short contact time cracking conditions, most of the cracking reactions take place in the very short time that the catalyst/oil mixture stream is in the reactor riser (1). As can be seen, in FIG. 1, the dimension of the reactor riser (1) as utilized herein is the elevation distance of the reactor riser from the elevation of the outlet end of the U-bend assembly (65), which is also termed herein as the "reactor riser inlet elevation", to the elevation (15) wherein the catalyst/oil mixture leaves the reactor riser (1), which is also termed herein as the "reactor riser outlet elevation". If the fluid catalytic cracking reactor (20) incorporates mechanical cyclones (18), then the "reactor riser outlet elevation" (15) is the elevation of the centerline of the primary cyclone inlets. Otherwise, the "reactor riser outlet elevation" (15) is the elevation at which the reactor riser terminates in the fluid catalytic cracking reactor (20). Although the reactor riser as shown in FIG. 1 illustrates an external reactor riser, the terms and dimensions above apply even if the riser enters the bottom of the fluid catalytic cracking reactor (20), or the side of the fluid catalytic cracking reactor (20) at an elevation that is different from the reactor riser outlet elevation.

The elevation of the outlet of a regenerated catalyst return line assembly as used herein is the point at which the outlet end of the downstream bend (or simply "bend" if a U-bend) of the assembly (i.e., the end of the curved conduit section of the return line) is contacted with the reactor riser (1) (i.e., straight conduit section). Similarly, the elevation of the inlet of a regenerated catalyst return line assembly as used herein is the point at which the inlet end of the upstream bend (or simply "bend" if a U-bend) of the assembly is contacted with the regenerator standpipe (55) (i.e., straight conduit section). More preferably, the centerline of the outlet end of the downstream bend and the reactor riser are concurrent at the point of contact with each other. Similarly, in a preferred embodiment, the centerline of the inlet end of the upstream bend and the regenerator standpipe are concurrent at the point of contact with each other. Therefore, regardless of the type of catalyst return line assembly referred to herein, the term "reactor riser length" is the vertical length of the reactor riser and is defined herein as the absolute difference between the reactor riser inlet elevation and the reactor riser outlet elevation. The terms "upstream" and "downstream" as used herein refer to a flow of regenerated catalyst from the regenerator side (upstream) of the regenerated catalyst return line assembly to the reactor riser side (downstream) of the regenerated catalyst return line assembly.

In the fluid catalytic cracking reactor (20), most of the cracked hydrocarbons are separated from the catalyst by mechanical means. Most commonly mechanical separation devices such as cyclones are utilized to accomplish this task in the reactor vessel. For simplification, most of the internals of the fluid catalytic cracking reactor (20) are not shown in FIG. 1, but in short contact-time cracking operations it is generally desired to make the separation of the cracked hydrocarbon products from the catalyst as quickly as possible to avoid uncontrollable reactions. A primary mechanical cyclone (18) is illustrated in FIG. 1 as a preferred method for separating the catalyst from the cracked hydrocarbon products generated from the catalytic cracking reactions in the reactor riser (1). In the fluid catalytic cracking reactor (20), the catalyst is generally stripped of as much of the adhered hydrocarbon material as possible and the stripped catalyst is removed from the fluid catalytic cracking reactor (20) as spent catalyst (25) and removed from the reactor via line (30).

The spent catalyst is conducted to the regenerator (40) and enters the regenerator via line (35). For simplification purposes, the spent catalyst return line between the reactor and the regenerator is not illustrated. In the regenerator (40), the spent catalyst is contacted with air or an oxygen-containing gas stream at temperatures from about 1100° F. to 1400° F. (593 to 760° C.) in order to combust hydrocarbon and carbon molecules that remain adhered to the catalyst. These combustion products are removed from the regenerator (40) via the flue gas line (45). This combustion process results in a regenerated catalyst (50) which can then be recirculated to the reaction process.

The spent catalyst leaves the regenerator (40) via a regenerator standpipe (55). The rate of flow of the regenerated catalyst back into the reaction process is commonly controlled by the use of a slide valve or adjustable orifice valve (60) which can be adjusted to varying partially opened or closed positions to control the regenerated catalyst flow. The regenerated catalyst is returned to the reaction process via a regenerated catalyst return line. In FIG. 1, a U-bend regenerated catalyst return line (65) configuration is illustrated. The horizontal dotted lines show the elevation of the inlet and outlet of the U-bend regenerated catalyst return line (65). As can be seen, in the U-bend configuration of the prior art, a single bend radius ($R_U$) is utilized and the overall internal bend angle $\alpha_U$ is substantially 180°. In this U-bend configuration the distance between the centerline of the regenerator standpipe and the centerline of the reactor riser or set by the U-bend radius (i.e., $y \approx 2 \ast R_U$). Similarly, the elevation of the outlet of the U-bend regenerated catalyst return line is substantially fixed by the elevation of the assembly's inlet. In addition, the overall height of the U-bend regenerated catalyst return line is essentially fixed (i.e., $z \approx R_U$).

While these fixed dimensions may generally not present significant problems in the original design of a fluid catalytic cracking unit, these restrictions can be of significant problems when attempting to modify an existing unit. As discussed prior, one such problem can occur when attempting to increase the overall reactor riser length on an existing unit that incorporates a U-bend regenerated catalyst return line.

Figure 2:
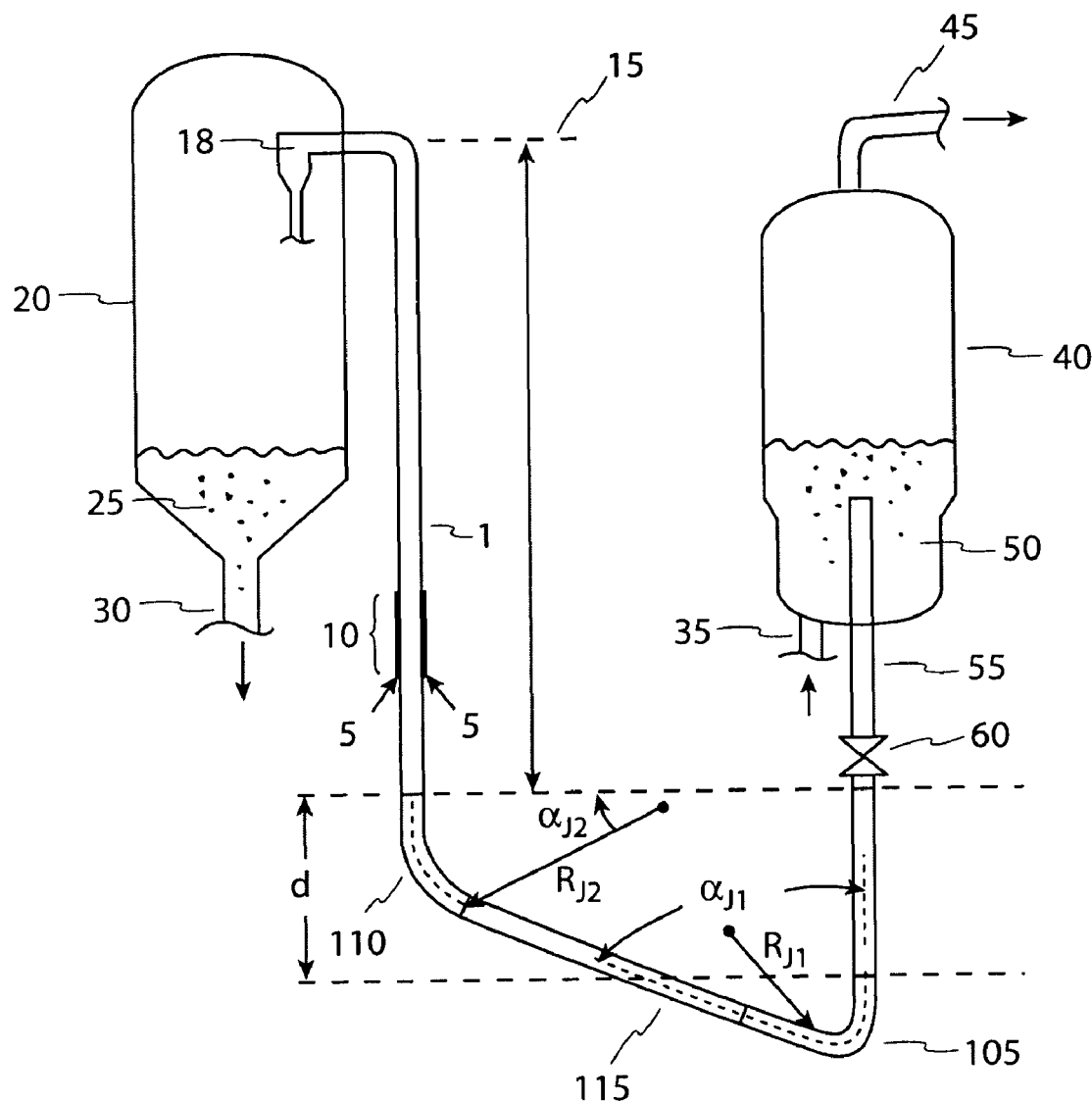
FIG. 2 depicts a simplified illustration of typical J-bend configuration of the prior art for a regenerated catalyst return line in conjunction with the regenerator standpipe and reactor riser of a fluid catalytic cracking unit.

The other common regenerated catalyst return line assembly utilized for fluid catalytic cracking units is the J-bend configuration as illustrated in FIG. 2 herein. The overall flow of the fluid catalytic cracking unit for FIG. 2 is similar for elements (1) through (60) as shown as described for FIG. 1, above. However, in this configuration the J-bend regenerated catalyst return line assembly is comprised of at least an upstream J-bend (105) and a downstream J-bend (110) separated by at least one straight line section (115). Here, it can be seen that the J-bend regenerated catalyst return line assembly can be designed so that the inlet of the J-bend assembly and the outlet of the J-bend assembly can be at different elevations. However, the J-bend assembly is designed so that the elevation of the outlet end of the downstream bend is at a higher elevation that the inlet end of the upstream bend by a distance "d" as shown in FIG. 1. Additionally, a significant drawback that can be experienced when utilizing J-bend assemblies includes a higher pressure drop across the assembly than that of a comparable U-bend configuration due to the acute included angle and small bend radius of at least one of the J-bends in the assembly, such as shown as upstream J-bend (105) with a bend radius, $R_{J1}$, and an internal bend angle $\alpha_{J1}$ in FIG. 2. The downstream J-bend (110) bend has a bend radius $R_{J2}$ and an internal bend angle $\alpha_{J2}$ as shown in FIG. 2.

What has been discovered is a novel regenerated catalyst return line assembly that allows for an increased reactor riser length for a set catalyst return line assembly inlet elevation. As discussed prior, this "reduced elevation" regenerated catalyst return line assembly can be very beneficial in the modification of existing fluid catalytic cracking units utilizing either the U-bend or J-bend assembly configuration where additional reactor riser length is desired and/or where new or existing equipment interferences prohibit the easy use of the U-bend or J-bend assembly configuration.

Figure 3:
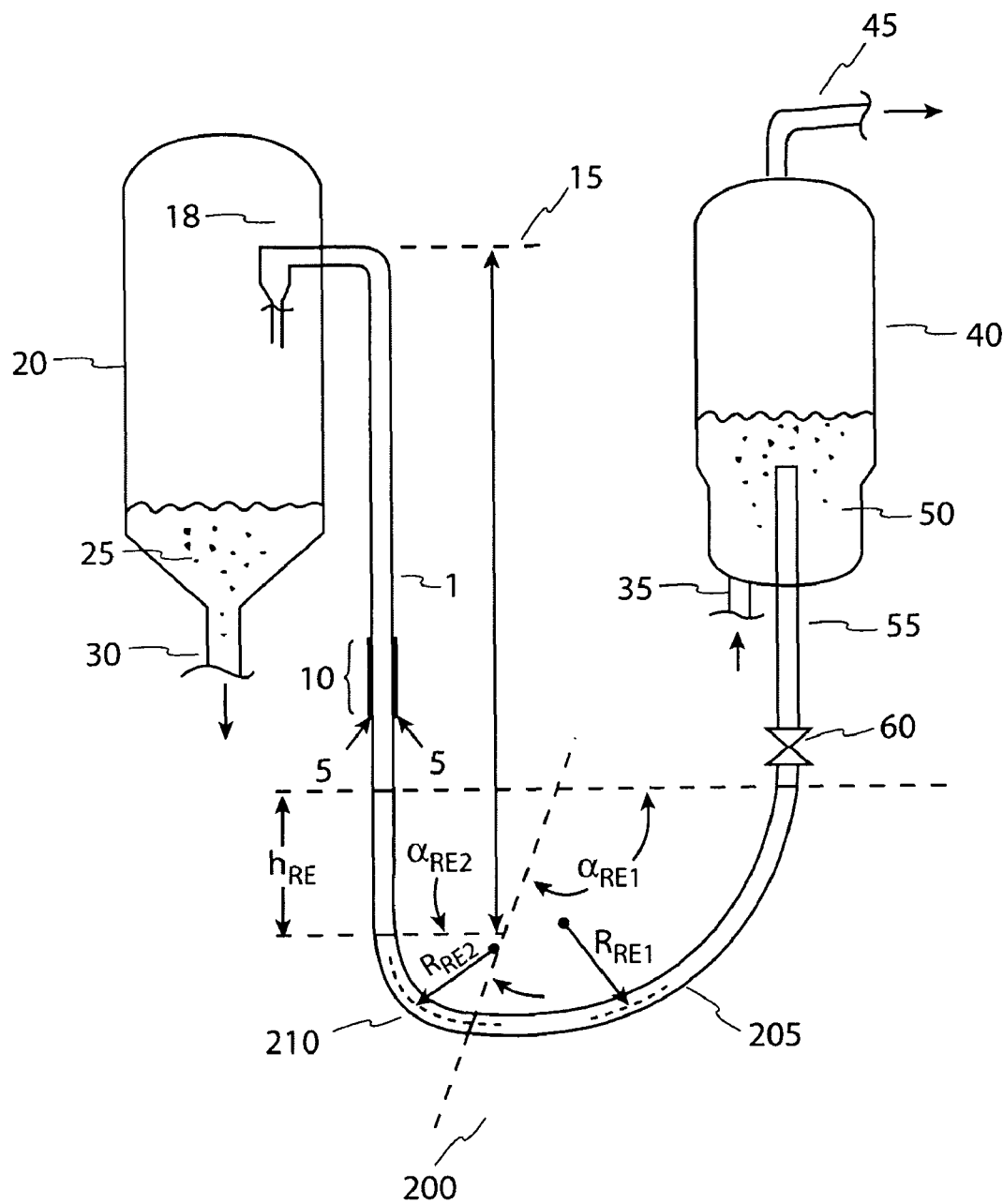
FIG. 3 depicts one embodiment of the reduced elevation regenerated catalyst return line of the present invention wherein two conjoined non-equal radii bends are utilized as shown in conjunction with the regenerator standpipe and reactor riser of a fluid catalytic cracking unit.

One embodiment of the reduced elevation regenerated catalyst return line assembly according to the present invention is shown in FIG. 3 in conjunction with a typical fluid catalytic cracking unit regenerator and reactor. The overall flow of the fluid catalytic cracking unit for FIG. 3 is similar for elements (1) through (60) as shown as described for FIGS. 1 and 2, above. In the present invention, an upstream and downstream bend each with a differing bend radius are in physical contact with each other wherein the overall horizontal span between the centerline of the inlet of the first bend to the outlet of the second bend is substantially equal to the distance between the centerlines of the regenerator standpipe (55) and the reactor riser (1).

As can be seen in FIG. 3, the embodiment of the reduced elevation (or "RE" or "RE-bend") regenerated catalyst return line assembly (200) of the present invention allows a transitional connection spanning between the regenerator standpipe (55) and the reactor riser (1). The embodiment of the reduced elevation regenerated catalyst return line assembly (200) as shown in FIG. 3 is comprised of an upstream bend (205) which has a bend radius of $R_{RE1}$ and an internal bend angle $\alpha_{RE1}$, wherein the outlet end of the upstream bend (205) is physically connected to the inlet end of the downstream bend (210) which has a bend radius of $\alpha_{RE2}$ and an internal bend angle $\alpha_{RE2}$. In this embodiment of the present invention, the inlet end of the upstream bend (205) is physically contacted with the regenerator standpipe (55) and the outlet end of the downstream bend (210) is physically contacted with the reactor riser (1). In a preferred embodiment, the centerline of inlet end of the upstream bend (205) of the reduced elevation regenerated catalyst return line assembly of the present invention is substantially concurrent with the centerline of the regenerator standpipe (55). In another preferred embodiment, the centerline of outlet end of the downstream bend (210) of the reduced elevation regenerated catalyst return line assembly of the present invention is substantially concurrent with the centerline of the reactor riser (1). In a most preferred embodiment, the sum of the internal angles of the upstream and downstream bends (i.e. $\alpha_{RE1} + \alpha_{RE2}$) is equal to about 180°.

In FIG. 3, it can be seen that the reactor riser (1) can be increased by a length, "$h_{RE}$", as shown by utilizing the present invention. This distance, $h_{RE}$, can be modified by altering the radii of either or both $R_{RE1}$ and $R_{RE2}$, and/or the internal angle α of the upstream bend (205) and/or downstream bend (210). In this embodiment of the present invention embodiment, $R_{RE1}$ and $R_{RE2}$ are different radii. In yet a more preferred embodiment, $R_{RE1}$ is greater than $R_{RE2}$.

It should be noted that as used throughout the specification herein, the terms "upstream" and "downstream" refer to the direction of flow of the regenerated catalyst from the regenerator standpipe side of the assembly (upstream) to the reactor riser side of the assembly (downstream). Similarly, the terms "inlet" and "outlet" as used herein are synonymous with the direction of "upstream" and "downstream", respectively as defined herein.

Figure 4:
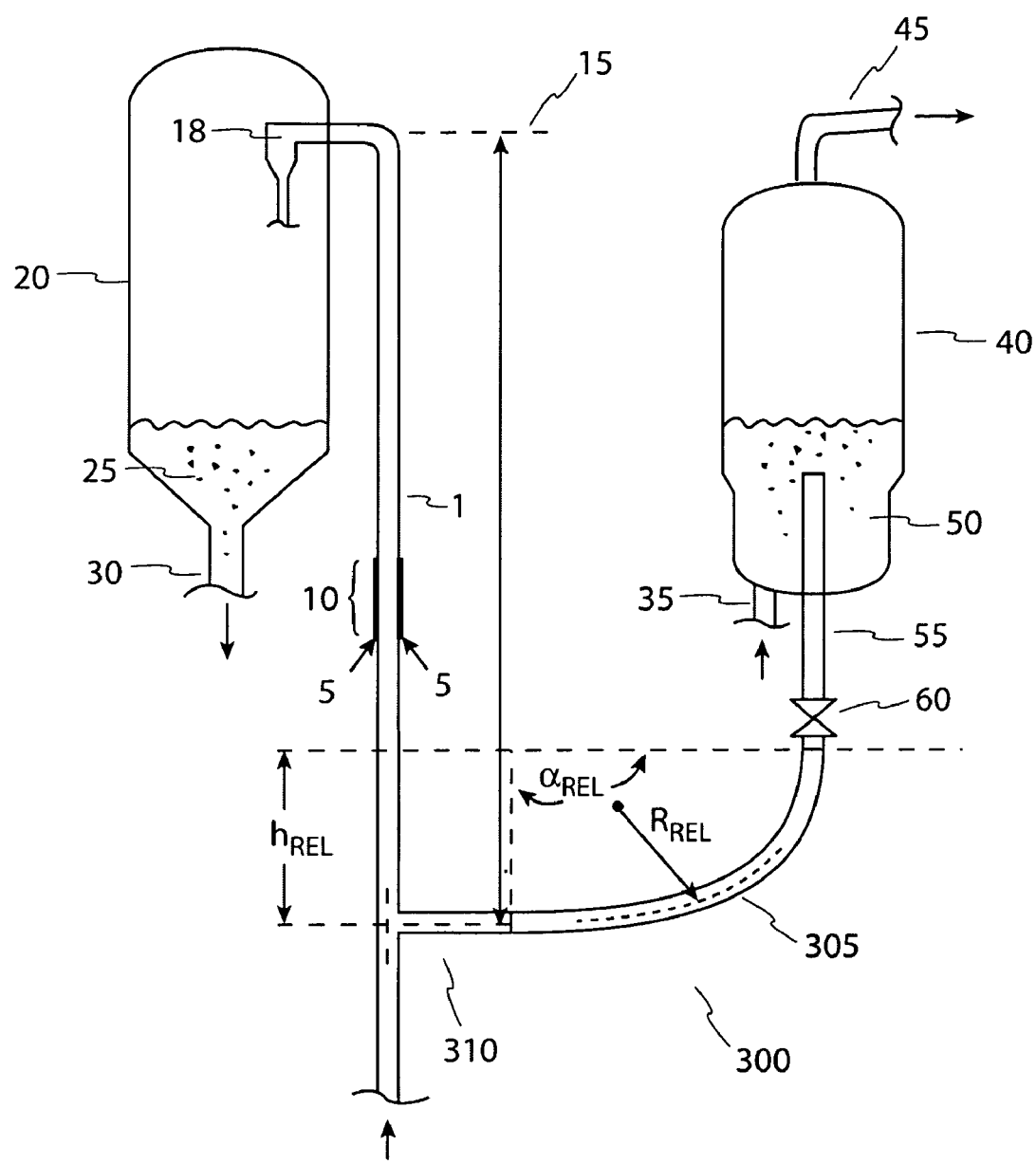
FIG. 4 depicts one embodiment of the reduced elevation regenerated catalyst return line of the present invention wherein a single radii bend is utilized as shown in conjunction with the regenerator standpipe and reactor riser of a fluid catalytic cracking unit.
Figure 5:
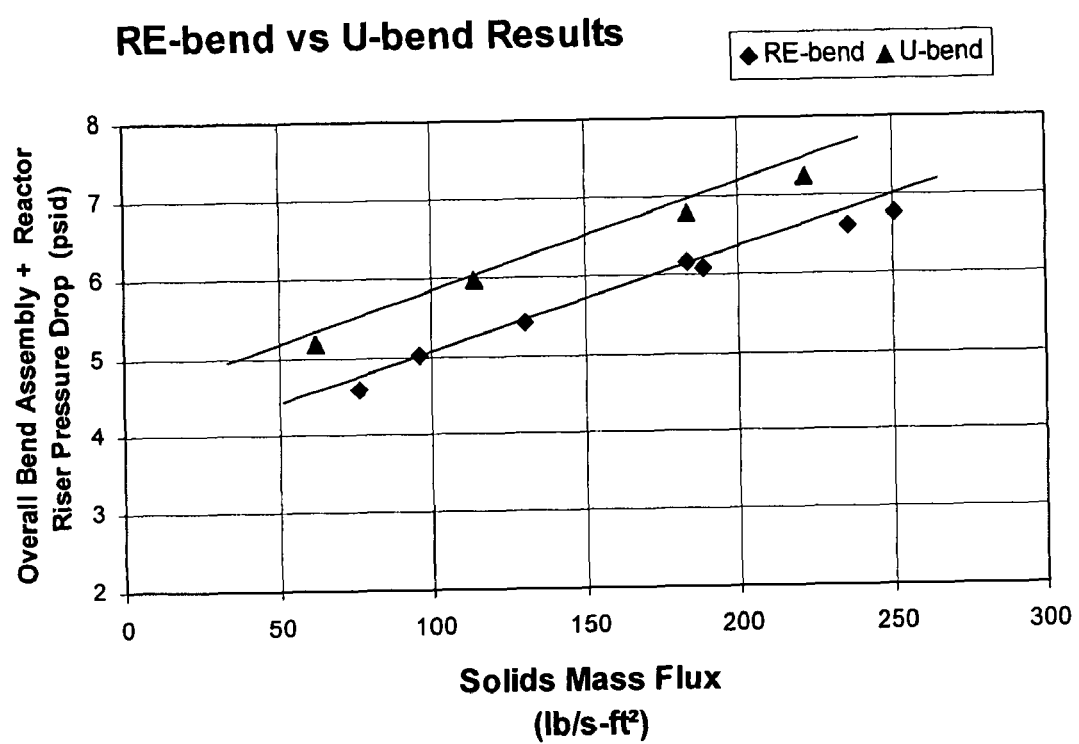
FIG. 5 is a graph of the overall pressure drop of a RE-bend regenerated catalyst return line/reactor riser assembly of the present invention as compared with a U-bend regenerated catalyst return line/reactor riser assembly of the prior art.

In another embodiment of the present invention, reduced elevation regenerated catalyst return line assembly is comprised of a single bend optionally coupled with a straight section of line which intersects the reactor riser. FIG. 4 illustrates an embodiment a reduced elevation regenerated catalyst return line assembly termed as a "reduced elevation L-bend" or REL-bend" assembly wherein the inlet end of the REL-bend (305) of the REL-bend assembly (300) is physically connected with the regenerator standpipe (55). It is preferable that the internal angle, $\alpha_{REL}$, of the REL-bend assembly be about 90°. As shown in FIG. 5, the outlet end of the REL-bend (305) may optionally physically connected with the inlet end of a substantially straight section of pipe (310) and wherein the outlet end of the substantially straight section of pipe intersects and connects with an extended portion of the reactor riser (1). In another preferred embodiment, the assembly is comprised of a single L-bend without any substantially straight section of pipe and in this embodiment, the outlet end of the REL-bend directly intersects and connects an extended portion of the reactor riser (1). In still another preferred embodiment, the REL-bend assembly intersects the extended portion of the reactor riser (1) at a substantially 90° angle.

As can be seen in FIG. 5, the REL-bend assembly embodiment of the present invention allows the overall riser length to be increased by a distance "$h_{REL}$". Also this embodiment may allow a viable option for retrofitting existing fluid catalytic cracking units where significant interferences exist.

As discussed, the reduced elevation regenerated catalyst return line assemblies of the present invention are able to provide configurations that allow the overall reactor riser length to be extended. Additionally, it has unexpectedly been discovered that the reduced elevation regenerated catalyst return line assembly configurations of the present invention may also result in a lower overall pressure drop in the combined regenerated catalyst return line and reactor riser portion of the fluid catalytic cracking circuit. This is very unexpected since it would be expected that the higher radius bend curvatures utilized in the present invention as compared to the U-bend configuration would result in a higher pressure drop. However, as illustrated in Example 1 below, in performance tests performed comparing a reduced elevation regenerated catalyst return line/reactor riser assembly according to the present invention to a comparable conventional U-bend regenerated catalyst return line/reactor riser assembly, the reduced elevation regenerated catalyst return line/reactor riser assembly of the present invention resulted in a lower overall pressure drop for the combined regenerated catalyst return line and reactor riser circuit as compared to the prior art.

Preferably, the reduced elevation regenerated catalyst return line assemblies of the present invention are utilized in a refinery FCC process for catalytically cracking heavy hydrocarbons into lower boiling range hydrocarbon materials. Suitable hydrocarbon feeds for the refinery FCC process described herein include natural and synthetic hydrocarbonaceous oils boiling in the range of about 430° F. to about 1050° F. (221 to 566° C.), such as gas oil; heavy hydrocarbonaceous oils comprising materials boiling above 1050° F. (566° C.); heavy and reduced petroleum crude oil; petroleum atmospheric distillation bottoms; petroleum vacuum distillation bottoms; pitch, asphalt, bitumen, other heavy hydrocarbon residues; tar sand oils; shale oil; liquid products derived from coal liquefaction processes, naphtha, and mixtures thereof.

FCC catalysts may be amorphous, e.g., silica-alumina, crystalline, e.g., molecular sieves including zeolites, or mixtures thereof. A preferred catalyst particle comprises (a) an amorphous, porous solid acid matrix, such as alumina, silica-alumina, silica-magnesia, silica-zirconia, silica-thoria, silica-beryllia, silica-titania, silica-alumina-rare earth and the like; and (b) a zeolite. The matrix can comprise ternary compositions, such as silica-alumina-thoria, silica-alumina-zirconia, magnesia and silica-magnesia-zirconia. Silica-alumina is particularly preferred for the matrix, and can contain about 10 to 60 wt. % alumina. Promoters can also be added.

The amount of zeolite component in the catalyst particle will generally range from about 1 to about 60 wt. %, preferably from about 5 to about 60 wt. %, and more preferably from about 10 to about 50 wt. %, based on the total weight of the catalyst. As discussed, the catalyst is typically in the form of a catalyst particle contained in a composite. The cracking catalyst may include a medium pore zeolite having a Constraint Index (which is defined in U.S. Pat. No. 4,016,218) of about 1 to about 12. Suitable medium pore zeolites include ZSM-5, ZSM-11, ZSM-12, ZSM-22, ZSM-23, ZSM-35, ZSM-48, ZSM-57, SH-3 and MCM-22, either-alone or in combination. Preferably, the medium pore zeolite is ZSM-5.

Preferably, the reduced elevation regenerated catalyst return line assembly according to the present invention is utilized in a refinery FCC short-contact time cracking configuration wherein the hydrocarbon feed will contact the cracking catalyst for less than about 10 seconds, preferably less than 5 seconds. The short contact time reaction step can be achieved using any of the known processes. As discussed prior, the present invention can be utilized to increase the reactor riser length with very little modifications. This can allow an existing FCC riser to be run at higher velocities and subsequent cracking capacities while still maintaining the same overall catalyst:oil contact time.

Short-contact time conditions include reactor riser outlet temperatures from about 900° F. to about 1200° F. (482 to 649° C.), pressures from about 0 to about 100 psig (0 to 690 kPa) with preferred reactor riser residence times from about 1 to about 5 seconds. In another preferred embodiment, the FCC process includes a catalyst:oil weight ratio in the reaction zone from about 2:1 to about 20:1, more preferably from about 3:1 to about 10:1.

The above description of preferred embodiments is directed to preferred means for carrying out the present invention. Those skilled in the art will recognize that other means that are equally effective could be devised for carrying out the spirit of this invention.

The benefits of embodiments of the present invention are further illustrated by the following examples.

EXAMPLES

Example 1

In this example, the flow performance of a U-bend regenerated catalyst return line/reactor riser assembly was tested against the reduced elevation ("RE") regenerated catalyst return line/reactor riser assembly of the present invention.

The U-bend/reactor riser assembly used in the test was to represent the baseline performance of the U-bend technology of the prior art. In this portion of the test, a U-bend assembly was fabricated from 6 inch schedule 40 pipe. The U-bend assembly was constructed similar to the U-bend assembly shown in FIG. 1. The U-bend assembly utilized in this example had a bend radius, $R_U$, of 42 inches.

The inlet of the U-bend assembly was connected to a vertical 6 inch schedule 40 pipe simulating a regenerator standpipe supplying dense flowing fluidized catalyst to the bend assembly. The outlet of the U-bend test assembly was connected to a vertical 6 inch schedule 40 pipe simulating a reactor riser with a lift gas velocity maintained at approximately 40 ft/sec. The catalyst used in the flow testing was a typical FCC catalyst with an average particle size of 77 microns.

Pressure indicators were placed on the U-bend/reactor riser assembly to measure the overall pressure drop at varying catalyst flow rates. The U-bend/reactor riser assembly was then performance tested at varying catalyst flow rates and the corresponding pressure drops at these rates were measured. Data from this portion of the testing is shown in Table 1, below.

TABLE 1

U-bend/Reactor Riser Assembly Test Results

| Catalyst Flow Rate (lb/s-ft²) | ΔP across U-Bend/Reactor Riser (psid) |
|---|---|
| 62 | 5.17 |
| 114 | 5.98 |
| 183 | 6.79 |
| 222 | 7.22 |

Example 2

In a similar manner, a reduced elevation ("RE") regenerated catalyst return line/reactor riser assembly (or "RE-bend") of the present invention was fabricated and performance tested. In this portion of the test, a RE-bend assembly was fabricated from 6 inch schedule 40 pipe.

The RE-bend assembly was constructed similar to the assembly as shown in FIG. 3. The upstream bend was fabricated with a bend radius, $R_{RE1}$, of 42 inches. The upstream bend was physically connected to the downstream bend with a bend radius, $R_{RE2}$, of 14 inches.

The inlet (regenerator standpipe) and outlet (reactor riser) configurations attached to the RE-bend assembly tested were the same as utilized in the U-bend testing of Example 1. Additionally, the lift gas and catalyst properties for the RE-bend testing were also similar to those utilized for the U-bend testing in Example 1 above.

Pressure indicators were placed on the RE-bend/reactor riser assembly to measure the overall pressure drop at varying catalyst flow rates. The RE-bend/reactor riser assembly was then performance tested at varying catalyst flow rates and the corresponding pressure drops at these rates were measured. Data from this portion of the testing is shown in Table 2, below.

TABLE 2

RE-bend/Reactor Riser Test Results

| Catalyst Flow Rate (lb/s-ft²) | ΔP across RE-Bend/Reactor Riser (psid) |
|---|---|
| 76 | 4.60 |
| 96 | 5.02 |
| 131 | 5.42 |
| 183 | 6.15 |
| 188 | 6.06 |
| 236 | 6.60 |
| 251 | 6.76 |

FIG. 6 presents a plot comparing the results from Examples 1 and 2. As can be seen comparing the data from the U-bend/reactor riser assembly testing in Table 1 and the data from the RE-bend/reactor riser assembly testing in Table 2, in addition to the benefits described prior, the RE-bend assembly of the present invention can also result in improved performance, in particular, a lower overall pressure drop as compared to conventional U-bend assemblies.

The RE-bend/reactor riser configuration imparts beneficial flow characteristics to minimize the frictional losses of the catalyst flow through the assembly thereby resulting in a lower required pressure drop across the overall RE-bend/reactor riser assembly than comparable return bend assemblies of the prior art.

It can be seen by comparing the 183 lb/s-ft² data point from Table 1 and the 183 lb/s-ft² data point from Table 2, and their corresponding bend pressure drops, that the pressure drop across the RE-bend/reactor riser assembly is about 91% of the pressure drop across the comparable U-bend/reactor riser assembly. Similarly, comparing the 222 lb/s-ft² data point from Table 1 and the 236 lb/s-ft² data point from Table 2, the pressure drop across the RE-bend/reactor riser assembly is also about 91% of the pressure drop across the comparable U-bend/reactor riser assembly. In a preferred embodiment of the present invention, the pressure drop across the RE-bend/reactor riser assembly would be less than the pressure drop across a comparable U-bend/reactor riser assembly. More preferably, an embodiment of the present invention, the pressure drop across the RE-bend/reactor riser assembly would be less than about 95% of the pressure drop across a comparable U-bend/reactor riser assembly.

As can be seen in these Examples, the reduced elevation catalyst return line assemblies of the present invention can provide superior performance to a comparable U-bend catalyst return line by reducing the overall pressure drop in a fluid catalytic cracking process catalyst return line/riser circuit.

What is claimed is:

1. A regenerated catalyst conduit for fluidly connecting a regenerator standpipe to a reactor riser of a fluid catalytic cracking unit, comprising:
   a) a first bend with a bend radius, $R_1$, and an inlet end and an outlet end; and
   b) a second bend with a bend radius, $R_2$, and an inlet end and an outlet end;
   wherein the inlet end of the first bend is physically connected to the outlet end of the regenerator standpipe, the outlet end of the first bend is physically connected, without an intervening structure, to the inlet end of the second bend, the outlet end of the second bend is physically connected to the inlet end of the reactor riser, and
   $R_1$ is not equal to $R_2$.

2. The conduit of claim 1, wherein the outlet end of second bend is at a lower elevation than the inlet end of the first bend.

3. The conduit of claim 2, wherein regenerator standpipe and the reactor riser have a substantially vertical section above the regenerated catalyst conduit.

4. The conduit of claim 2, wherein $R_1$ is greater than $R_2$.

5. The conduit of claim 2, wherein the internal angle of the first bend, $\alpha_1$, is greater than the internal angle of the second bend, $\alpha_2$.

6. The conduit of claim 4, wherein the internal angle of the first bend, $\alpha_1$, is greater than the internal angle of the second bend, $\alpha_2$.

7. The conduit of claim 4, wherein the centerline of the regenerator standpipe at the point where it connects to the inlet end of the first bend is substantially concurrent with the centerline of the inlet end of the first bend.

8. The conduit of claim 4, wherein the centerline of the reactor riser at the point where it connects to the outlet end of the second bend is substantially concurrent with the centerline of the outlet end of the second bend.

9. The conduit of claim 7, wherein the centerline of the reactor riser at the point where it connects to the outlet end of the second bend is substantially concurrent with the centerline of the outlet end of the second bend.

10. The conduit of claim 7, wherein the sum of the internal angle of the first bend, $\alpha_1$, and the internal angle of the second bend, $u_2$ is substantially 180°.

11. A fluid catalytic cracking process, comprising:
    a) catalytically cracking a hydrocarbon-containing feedstream in a reactor riser the presence of a fluidized catalyst to form a mixture of a cracked hydrocarbon product stream and a spent catalyst;
    b) separating the cracked hydrocarbon product stream from the spent catalyst, wherein the spent catalyst comprises hydrocarbon residue;
    c) regenerating at least a portion of the spent catalyst in a regenerator by combusting at least a portion of the hydrocarbon residue in an oxygen-containing atmosphere to produce a regenerated catalyst;
    d) conducting at least a portion of the regenerated catalyst from the regenerator to a regenerated catalyst conduit through a regenerator standpipe; and
    e) transporting at least a portion of the regenerated catalyst to the reactor riser through the regenerated catalyst conduit;
    wherein the regenerated catalyst conduit fluidly connects the regenerator standpipe to the reactor riser and is comprised of a first bend with a bend radius, $R_1$, and an inlet end and an outlet end; and a second bend with a bend radius, $R_2$, and an inlet end and an outlet end; wherein the inlet end of the first bend is physically connected to the outlet end of the regenerator standpipe, the outlet end of the first bend is physically connected, without an intervening structure, to the inlet end of the second bend, the outlet end of the second bend is physically connected to the inlet end of the reactor riser, and $R_1$ is not equal to $R_2$.

12. The process of claim 11, wherein the outlet end of second bend is at a lower elevation than the inlet end of the first bend.

13. The process of claim 12, wherein the hydrocarbon-containing feedstream is comprised of hydrocarbonaceous oils boiling in the range of about 430° F. to about 1050° F. (221 to 566° C.).

14. The process of claim 13, catalyst is comprised of a medium pore zeolite selected from the group consisting of ZSM-5, ZSM-11, ZSM-12, ZSM-22, ZSM-23, ZSM-35, ZSM-48, ZSM-57, SH-3 and MCM-22, and combinations thereof.

15. The process of claim 14, wherein the hydrocarbon-containing feedstream is contacted with the regenerated catalyst in the reactor riser for less than about 5 seconds.

16. The process of claim 13, wherein the short-contact time conditions include riser outlet temperatures from about 900° F. to about 1200° F. (482 to 649° C.) and pressures from about 0 to about 100 psig (0 to 690 kPa).

17. The process of claim 16, wherein $R_1$ is greater than $R_2$, and the internal angle of the first bend, $\alpha_1$, is greater than the internal angle of the second bend, $\alpha_2$.

* * * * *